United States Patent [19]

Wiener

[11] Patent Number: 4,573,351
[45] Date of Patent: Mar. 4, 1986

[54] HUB MOMENT SENSOR FOR A HORIZONTAL ROTOR AIRCRAFT

[75] Inventor: Robert P. Wiener, White Plains, N.Y.
[73] Assignee: Litton Systems, Inc., Mount Vernon, N.Y.
[21] Appl. No.: 579,863
[22] Filed: Feb. 13, 1984
[51] Int. Cl.⁴ .................................... G01C 21/00
[52] U.S. Cl. ........................ 73/178 H; 73/862.04
[58] Field of Search ............ 73/862.04, 178 R, 178 H

[56] References Cited

FOREIGN PATENT DOCUMENTS 1381946  1/1975  United Kingdom ............ 73/862.04

Primary Examiner—Peter Chin
Attorney, Agent, or Firm—Brian L. Ribando

[57] ABSTRACT

A hub moment sensor is disclosed for an aircraft having a horizontal rotor, a rotor fixed mast for supporting the rotor above the aircraft body, and a support ring formed on the aircraft body for attachment to the rotor fixed mast. The sensor comprises an annular flange formed on the end of the rotor fixed mast remote from the rotor, and coupling means for securing the flange to the support ring, the coupling means including stress measuring means, whereby the moments acting on the aircraft may be sensed.

7 Claims, 5 Drawing Figures

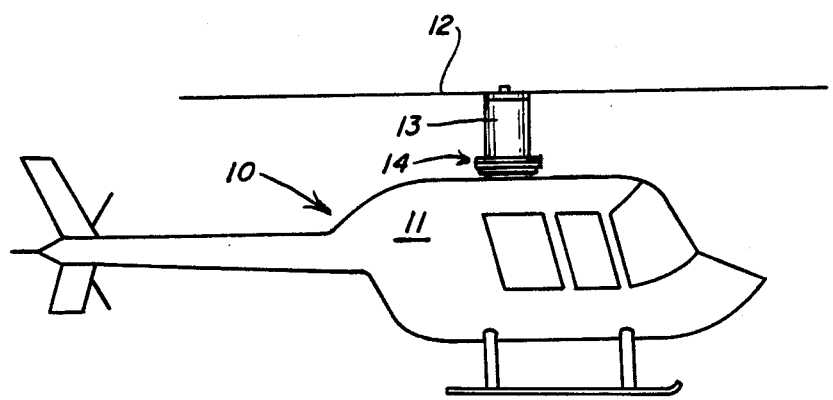
Fig_1
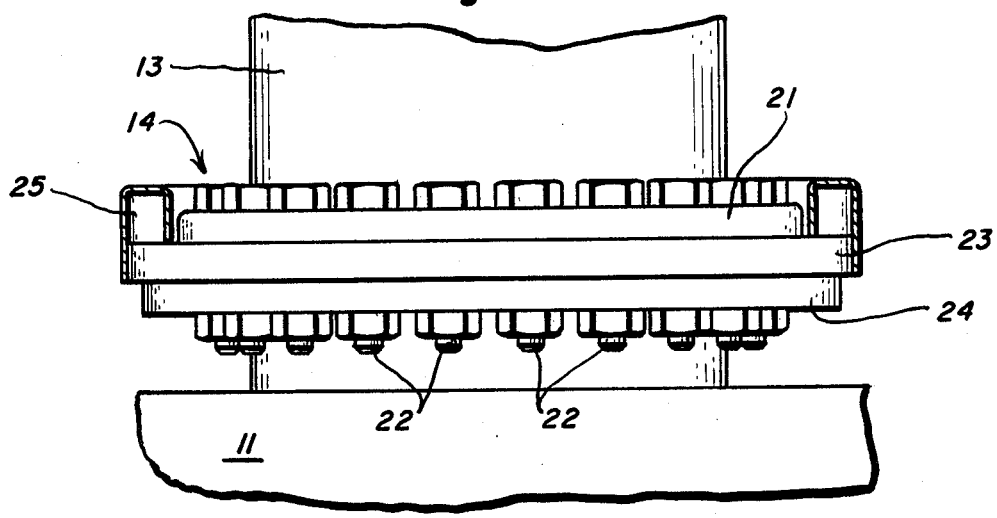
Fig_2

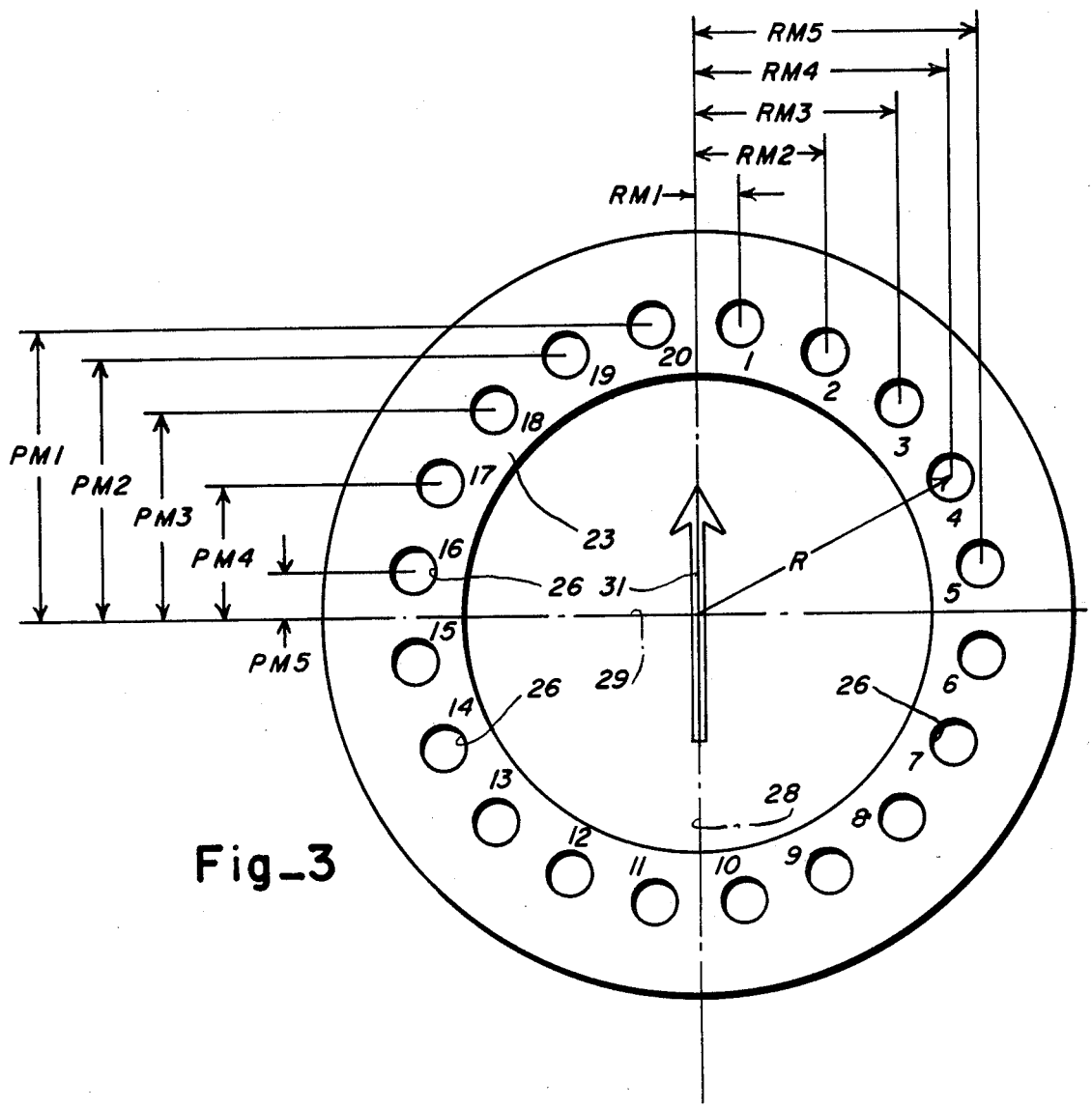
Fig_3
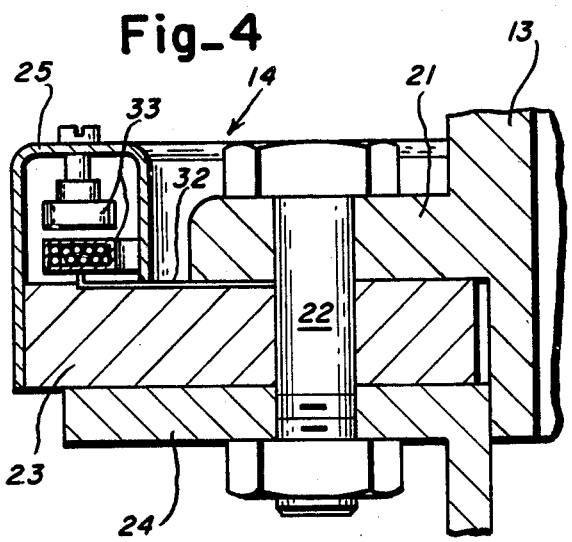
Fig_4
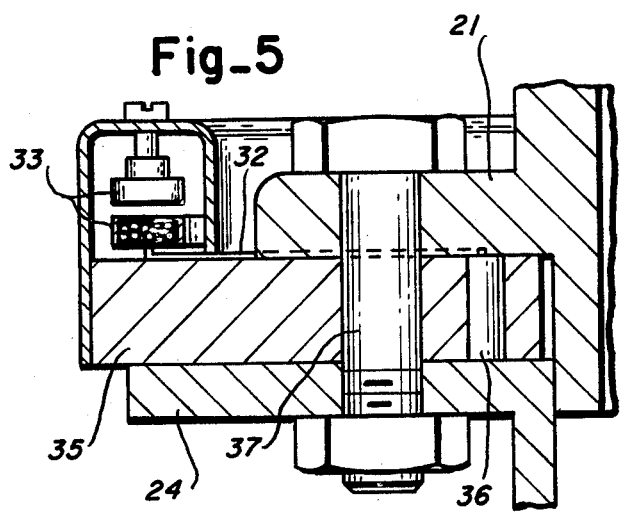
Fig_5

HUB MOMENT SENSOR FOR A HORIZONTAL ROTOR AIRCRAFT

BACKGROUND OF THE INVENTION

This invention relates to a hub moment sensor which develops signals indicative of the pitch and roll moments acting on a horizontal rotor aircraft.

Devices which are used to indicate the pitch and roll of aircraft are well known in the art. Such devices normally comprise instruments having verticality sensors which are mounted in the aircraft and which develop signals in response to movement of the aircraft. Such sensing instruments are not totally accurate when used to indicate the pitch and roll moments which are acting on an aircraft, however and such information is useful in controlling flight performance. There is therefore a need in the art for a pitch and roll moment sensor which is uniquely suited for use in horizontal rotor aircraft.

SUMMARY AND OBJECTS OF THE INVENTION

According to the invention, signals indicative of the pitch and roll of a horizontal rotor aircraft are derived from the stresses which exist at the hub assembly of the aircraft. A number of stress readings are taken from gauges mounted around the periphery of hub and are processed in order to develop the desired pitch and roll moments.

It is, therefore, an object of the invention to provide a hub moment sensor for horizontal rotor aircraft to provide pitch and roll moment signals for the aircraft.

It is another object of the invention to provide hub moment sensor for an aircraft which sums the moments generated in the hub of the aircraft to develop the desired pitch and roll moment signals.

These and other objects of the invention will be apparent from the following detailed description taken in conjunction with the accompanying drawing figures in which reference numerals used throughout the description designate like or corresponding parts throughout the figures.

BRIEF DESCRIPTION OF THE DRAWINGS

FIG. 1 shows a horizontal rotor aircraft.

FIG. 2 shows the hub of a horizontal rotor aircraft.

FIG. 3 shows the roll and pitch moment arms around the hub of a horizontal rotor aircraft.

FIGS. 4 and 5 are cross-sectional views of two embodiments of the hub structure of FIG. 2.

DESCRIPTION OF THE PREFERRED EMBODIMENT

Turning now to the drawing figures, there is shown in FIG. 1 a horizontal rotor aircraft generally designated by the reference numeral 10. The aircraft 10 includes a body 11 and horizontal rotor 12 which is coupled to the body by means of a fixed rotor mast 13 which terminates in a hub assembly 14.

Referring now to FIG. 2, it will be seen that the hub assembly 14 comprises a flange 21 which is attached to the base of the rotor fixed mast 13. The flange 21 is coupled by a plurality of bolts 22 through a spacer ring 23 to a support ring 24 which is fixed to the body 11 of the aircraft. A channel 25 fixed to the spacer ring 23 contains electrical leads which emanate from the spacer ring 23 as described more fully below.

FIG. 3 shows a plan view of the spacer ring 23. The spacer ring includes apertures 26 numbered 1 through 20 spaced around the ring at 18° intervals and spaced from the center of the ring by a distance R. Each of the apertures 26 receives one of the bolts 22 (not shown) which holds the mast flange 21 to the support ring 24. The forward direction of the aircraft is defined by the arrow 31 as shown, the roll axis 28 is defined as the line passing through the center of the spacer ring 23 parallel to the forward direction of the aircraft and the pitch axis 29 is defined as the line passing through the center of the spacer ring 23 and perpendicular to the forward direction of the aircraft. Accordingly, the roll moment acting on the aircraft will tend to tilt the aircraft around the roll axis 28 and the pitch moment will tend to tilt the aircraft around the pitch axis 29.

Since the weight of the aircraft is totally supported by the bolts 22 located in the hub assembly 14, the roll and pitch moments acting on the aircraft may be determined by analyzing the forces on the bolts 22. In order to perform such an analysis, the length of the moment arm for each of the bolt positions 1–20 relative to the roll axis 28 and to the pitch axis 29 must be known. Since the bolts are spaced evenly around the support ring at 18 degree intervals, the moment arm length for bolts 1–5 may be expressed as follows.

| Roll Moment Arms | Pitch Moment Arms |
| --- | --- |
| $RM1 = R \sin 9° = .1564R$ | $PM1 = R \cos 9° = .9877R$ |
| $RM2 = R \sin 27° = .4540R$ | $PM2 = R \cos 27° = .8910R$ |
| $RM3 = R \sin 45° = .7071R$ | $PM3 = R \cos 45° = .7071R$ |
| $RM4 = R \sin 63° = .8910R$ | $PM4 = R \cos 63° = .4540R$ |
| $RM5 = R \sin 81° = .9877R$ | $PM5 = R \cos 81° = .1564R$ |

The roll and pitch moment arm length for bolts at positions 6–20 may be derived in a similar way using basic trigonometric relationships; however, it will be noted that the value of the moment arms length is always expressed as a positive number.

FIG. 4 is a cross-section of a portion of the hub assembly 14 showing the hub assembly 14 comprising the flange 21 of the rotor fixed mast 13 which is coupled to the support ring 24 by a bolt 22. The spacer ring 23 separates the flange 21 of the rotor fixed mast 13 from the support ring 24.

In the preferred embodiment, each of the bolts 22 comprises a strain gauge. As known in the art, such strain gauges develop a signal which is proportional to the tension on the bolt. This signal is coupled by leads 32 to signal conductors 33 located within the channel 25. The strain in each bolt 22 may then be used to determine the total strain on the hub assembly and the length of the roll and pitch moment arms may be used to calculate the roll and pitch moments acting on the aircraft.

MODE OF OPERATION OF THE PREFERRED EMBODIMENT

During the assembly operation, the initial tension on each bolt 22 and the resulting strain thereon is noted. This initial tension reading is useful in that it acts as a check to insure that all strain gages are functioning properly, and further, the initial tension is used in the computations of lift, pitch and roll as described below.

When the aircraft is in flight, the total forces acting on the craft result from lift, pitch and roll. The lift, pitch, and roll forces are carried by the bolts, which are additionally loaded by the initial tension. The lift on the aircraft may be computed by adding the outputs of all twenty of the strain gauges 22 and subtracting the initial tension.

In order to determine the pitch moment acting on the aircraft, the tension on each bolt is read, and from this amount the value of the initial tension is subtracted to give the dynamic tension on each bolt. The dynamic tension is then multiplied by the distance of each bolt from the pitch axis 29 as shown in FIG. 3 to give a pitch moment for each bolt. The total pitch moment of the aircraft is the sum of the individual pitch moments.

In order to determine roll moment, the calculations are similar to the calculations used to determine the pitch moment, with the difference that the distance of each bolt from the roll axis 28 is used to determine the roll moment for each bolt which is then summed to provide the roll moment of the aircraft.

DESCRIPTION OF AN ALTERNATE EMBODIMENT

The strain gauges used in the invention may take a form other than that of the strain gauge bolts 22 shown in FIG. 4. A ring-shaped sensing module 35 such as shown in FIG. 5 may be used. The sensing module 35 is substituted for the spacer ring 23 in the hub assembly 14 and comprises a plurality of strain gauges 36 which may be located adjacent each bolt 37. Each strain gage 36 is positioned in the sensing module 35 to be sensitive to a change in the spacing between the flange 21 and the support ring 24. This change in spacing results when forces acting on the aircraft elongate some or all of the hub assembly bolts 37. The strain gages 36 are all initially pre-stressed so that an elongation of any of the bolts 37 resulting in a slight deflection of the flange 21 and the support ring 24 causes the strain gauge 36 to follow the deflection and to develop a signal corresponding thereto. The signals from the plurality of strain gauges 36 are coupled by leads 32 to the signal conductors 33 and are summed as in the example above to determine the lift, pitch moment and roll moment of the aircraft.

Having thus described the invention, various alterations and modifications thereof will occur to those skilled in the art, which modifications and alterations are intended to be within the scope of the invention as defined by the appended claims.

What is claimed is:

1. A hub moment sensor for an aircraft having a horizontal rotor, a rotor fixed mast for supporting the rotor above the aircraft body, and a support ring formed on the aircraft body for attachment to the rotor fixed mast, the sensor comprising;
    an annular flange formed on the end of the rotor fixed mast remote from the rotor,
    a plurality of bolts securing said flange to said support ring;
    an annular sensing module clampled by said bolts between said flange and said support ring, and
    a plurality of strain gauges positioned in said annular sensing module, said strain gauges being responsive to the elongation of said bolts whereby the moments acting on said aircraft may be sensed.

2. The hub moment sensor of claim 1 wherein the plurality of bolts are spaced equidistant around the circumference of the flange.

3. The hub moment sensor of claim 2 wherein the number of strain gauges is equal to to number of bolts securing the rotor fixed mast flange to the support truss.

4. The hub moment sensor of claim 3 wherein the strain gauges are spaced equidistant around the circumference of the sensing module.

5. A pitch and roll moment sensor for an aircraft having a horizontal rotor, a rotor fixed mast for supporting the rotor above the aircraft body, and a support ring formed on the aircraft body for attachment to the rotor fixed mast, the sensor comprising;
    an annular flange formed on the end of the rotor fixed mast remote from the rotor, and
    coupling means for supporting the weight of the aircraft and for securing said flange to said support ring, said coupling means including stress measuring means, whereby the pitch moment measured around a pitch axis which is perpendicular to the forward direction of the aircraft and the roll moment measured around a roll axis which is parallel to the forward direction of the aircraft may be sensed.

6. The hub moment sensor of claim 5 further comprising;
    strain gauge means, wherein each of said coupling means comprises said strain gauge means.

7. The hub moment sensor of claim 6 wherein said strain gauge means are spaced equidistant around the circumference of said flange.

* * * * *